United States Patent
Joshi

(10) Patent No.: US 7,408,911 B2
(45) Date of Patent: Aug. 5, 2008

(54) SYSTEM AND METHOD TO DECREASE THE ROUTE CONVERGENCE TIME AND FIND OPTIMAL ROUTES IN A WIRELESS COMMUNICATION NETWORK

(75) Inventor: Avinash Joshi, Orlando, FL (US)

(73) Assignee: MeshNetworks, Inc., Maitland, FL (US)

( * ) Notice: Subject to any disclaimer, the term of this patent is extended or adjusted under 35 U.S.C. 154(b) by 717 days.

(21) Appl. No.: 10/982,837

(22) Filed: Nov. 8, 2004

(65) Prior Publication Data

US 2006/0098608 A1 May 11, 2006

(51) Int. Cl.
*H04Q 7/24* (2006.01)
(52) U.S. Cl. .................. 370/338; 370/252; 370/225
(58) Field of Classification Search ............... 370/338, 370/252, 225
See application file for complete search history.

(56) References Cited

U.S. PATENT DOCUMENTS

| | | |
|---|---|---|
| 6,807,165 B2 | 10/2004 | Belcea |
| 6,873,839 B2 | 3/2005 | Stanforth |
| 6,904,021 B2 | 6/2005 | Belcea |
| 2002/0058502 A1 | 5/2002 | Stanforth |
| 2002/0191573 A1 | 12/2002 | Whitehill |
| 2004/0032847 A1* | 2/2004 | Cain ........................ 370/338 |
| 2004/0203820 A1* | 10/2004 | Billhartz .................. 455/452.1 |
| 2004/0246935 A1 | 12/2004 | Joshi |
| 2004/0252643 A1 | 12/2004 | Joshi |
| 2005/0157665 A1* | 7/2005 | Nanda et al. ................ 370/294 |
| 2006/0002368 A1* | 1/2006 | Budampati et al. .......... 370/351 |
| 2006/0034193 A1* | 2/2006 | Shi et al. ..................... 370/255 |
| 2006/0056370 A1* | 3/2006 | Hancock et al. ............. 370/338 |
| 2006/0224659 A1* | 10/2006 | Yu .............................. 709/201 |

OTHER PUBLICATIONS

Charles E. Perkins, Elizabeth M. Belding-Royer, and Samir Das, "Ad Hoc On Demand Distance Vector (AODV) Routing," IETF Experimental RFC, Jul. 2003.
D. B. Johnson, D. A. Maltz, Y. Hu, "The Dynamic Source Routing Protocol for Mobile Ad HOc Networks (DSR)," IETF Internet Draft, draft-ietf-manet-dsr-10.txt, Jul. 2004.
A. Joshi, "Load Balancing, Queueing and Scheduling Mechanisms in Mobile Ad Hoc Networks," MS Thesis, University of Cincinnati, Engeineering: Computer Science and Eng., 2001.
N. Gupta, "Resource Management in Ad Hoc Networks," MS Thesis, University of Cincinnati, Engineering: Computer Science and Engineering, 2001.

* cited by examiner

*Primary Examiner*—Brian D Nguyen
(74) *Attorney, Agent, or Firm*—Randi L. Karpinia; Joseph J. Buczynski

(57) ABSTRACT

A system and method for decreasing the route convergence time in a wireless communication network, such as a wireless ad-hoc peer-to-peer network, by finding an alternate route if the nodes anticipate weakening or breakage of a route currently in use. The system and method which enables reactive routing protocols to find optimal routes between nodes in these types of networks when those routes cannot otherwise be found in certain conditions. The system and method thus decrease the route convergence time, provide an effective and efficient way to find optimal routes, and improve overall performance of the network with regard to throughput, delay, packet completion rate and other factors.

23 Claims, 3 Drawing Sheets

SYSTEM AND METHOD TO DECREASE THE ROUTE CONVERGENCE TIME AND FIND OPTIMAL ROUTES IN A WIRELESS COMMUNICATION NETWORK

BACKGROUND OF THE INVENTION

1. Field of the Invention

The present invention relates to a system and method for decreasing the route convergence time in a wireless communication network, such as a wireless ad-hoc peer-to-peer network, by finding an alternate route if the nodes anticipate weakening or breakage of a route currently in use. More particularly, the present invention relates to a system and method which enables reactive routing protocols to find optimal routes between nodes in these types of networks when those routes cannot otherwise be found in certain conditions.

2. Description of the Related Art

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

In recent years, a type of mobile communications network known as an "ad-hoc" network has been developed. In this type of network, each mobile node is capable of operating as a base station or router for the other mobile nodes, thus eliminating the need for a fixed infrastructure of base stations. More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", granted on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", granted on Oct. 19, 2004, and in U.S. Pat. No. 6,873,839 entitled "Prioritized-Routing for an Ad-Hoc, Peer-to-Peer, Mobile Radio Access System", granted on Mar. 29, 2005, the entire content of each being incorporated herein by reference.

Two of the routing protocols being considered by IETF for mobile ad-hoc networks (MANET) are Ad-Hoc On-Demand Distance Vector (AODV) Routing Protocol as described, for example, in a publication by Charles E. Perkins, Elizabeth M. Belding-Royer, and Samir Das entitled "Ad Hoc On Demand Distance Vector (AODV) Routing." *IETF Experimental RFC*, July 2003, and Dynamic Source Routing (DSR) protocol as described in a publication by David B. Johnson, David A. Maltz and Yih-Chun Hu entitled "The Dynamic Source Routing Protocol for Mobile Ad Hoc Networks (DSR)" *IETF Internet draft*, July 2004, the entire content of both documents being incorporated herein by reference.

As can be appreciated by one skilled in the art, On-Demand routing protocols create routes only when desired by the source node, that is, the node that is attempting to transmit a data packet. When a node requires a route to a destination, it initiates a route discovery process within the network. This process is completed once a route is found or all possible route permutations have been examined. Once a route has been established, the route is maintained by some form of route maintenance procedure until either the destination becomes inaccessible along every path from the source or until the route is no longer desired.

As described in the publication by Perkins et al. cited above, a node following these On-Demand routing protocols initiates processing for a special message called as Route Error (RERR) in the following situations: if the node detects a link break for the next hop of an active route in its routing table while transmitting data (and route repair, if attempted, was unsuccessful), of if the node gets a data packet destined to a node for which it does not have an active route and is not repairing (if using local repair), or if the node receives a RERR from a neighbor for one or more active routes. In summary, the Route Error message is sent only when a node is absolutely sure that the link towards the next hop is unavailable.

As further described in the Perkins et al. publication, to detect link connectivity (or breakage), a node can use one of the following techniques. Any suitable link layer notification, such as those provided by IEEE 802.11, can be used to determine connectivity, each time a packet is transmitted to an active next hop. For example, absence of a link layer ACK or failure to get a CTS after sending RTS, even after the maximum number of retransmission attempts, indicates loss of the link to this active next hop. If layer-2 notification is not available, passive acknowledgment should be used when the next hop is expected to forward the packet, by listening to the channel for a transmission attempt made by the next hop. If transmission is not detected within NEXT_HOP_WAIT milliseconds or the next hop is the destination (and thus is not supposed to forward the packet), one of the following methods should be used to determine connectivity: receiving any packet (including a Hello message) from the next hop; a route request (RREQ) unicast to the next hop, asking for a route to the next hop; or an Internet Control Message Protocol (ICMP) Echo Request message unicast to the next hop.

Although these techniques are somewhat suitable, certain problems exist which impede their ability to detect link connectivity. For example, these techniques can erroneously indicate breakage of link because of a fail in packet transmission while a packet transmission can fail due to congestion rather than movement of node or breakage of link. Sending a route error message will delete the route maintained by several nodes to the node in question, thus forcing the nodes interested in sending packets to the node in question to restart the bandwidth-expensive route discovery process. Secondly, link layer will only inform the upper layers of failure after it has failed to transmit the packet after several retrials, which may be separated by considerable time and hence, significant delay will be accrued before triggering upper layers to respond.

Certain problems also exist with the passive acknowledgement techniques discussed above. That is, although passive acknowledgement has a very low probability of producing a false alarm, it has very long delay associated with the alarm process. For example, the number of hellos that need to be missed before a link break is declared needs to be of the order of n or more because of the low broadcast reliability of the wireless channel, where n can be as high as 5 or 10, or possibly more. Also, in both the link layer notification and passive acknowledgment techniques, any attempt to repair the route or find another route will be initiated only after the node attempting to send the data packet has determined that a break in the link exists. Hence, there is no "make before break" mechanism that is performed for either of these techniques.

Another problem with the On-Demand protocols discussed above is the optimization technique that they typically use to reduce the overhead in finding routes. This optimization technique is typically known as an "expanding ring search" in which the number of hops that a broadcast RREQ can travel is controlled as described the Perkins et al. publication cited above. Specifically, to prevent unnecessary network-wide dissemination of RREQs, the originating node should use an expanding ring search technique. In an expanding ring search, the originating node initially uses a Time to Live (TTL) value of TTL=TTL_START in the RREQ packet IP header and sets the timeout for receiving a route reply (RREP) to RING_TRAVERSAL_TIME milliseconds. The TTL_VALUE used in calculating RING_TRAVERSAL_TIME is set equal to the value of the TTL field in the IP header. If the RREQ times out without a corresponding RREP, the originator broadcasts the RREQ again with the TTL incremented by TTL_INCREMENT. This continues until the TTL set in the RREQ reaches TTL_THRESHOLD, beyond which a TTL=NET_DIAMETER is used for each attempt. Each time, the timeout for receiving a RREP is RING_TRAVERSAL_TIME. When it is desired to have all retries traverse the entire ad-hoc network, this can be achieved by configuring TTL_START and TTL_INCREMENT both to be the same value as NET_DIAMETER. Accordingly, this optimization (expanding ring search technique) may result in the problem illustrated by the following example network shown in FIG. 1.

Specifically, as shown in FIG. 1, a circle represents a node and lines (dashed or straight) represent the wireless link between the nodes. As indicated, all the links (if they exist) are good except the one between the nodes B and E. It is also assumed that the nodes do not have routes with each other. In this example, if node A wants to communicate with node E and uses the expanding ring search as described above, it will start with TTL=1. Hence, initially the RREQ will be received by nodes B and C. Assuming that these nodes do not know a route to node E, they will simply drop the RREQ after performing the processing as required as per the protocol. Since the TTL used is 1 initially, the RREQ packet will not be forwarded. After the timeout period, node A will resend RREQ with increased TTL which in this case will be 2 (new TTL=2 times old TTL). This time again the RREQ will be first received by nodes B and C. Since this time the value of TTL is 2, the RREQ will be forwarded by them. The RREQ forwarded by node C is received at nodes A and D. Node A ignores the message as it is the source of RREQ and node D drops it after updating the routing table as specified by protocol. Node D drops the RREQ because it can neither reply to it (as it doesn't have a route to E) nor can it forward it (as the TTL was set to 2 and has already traveled two hops). The RREQ forwarded by node B is received by nodes A and E. Node A ignores the message as it is the source of RREQ.

It should be noted that although the link between the nodes B and E is "bad", a small packet can still be sent due to the characteristic of a wireless channel and repeated retrial by the MAC layer. When node E receives the RREQ, it immediately replies with a RREP since it is the destination identified in the RREQ packet. This time, node A should receive the RREP before the expiration of its timer and hence it will not generate any new RREQ with a higher TTL value. Thus, node A chooses route via B to E, and the route through nodes C and D is not computed. In this particular case, the route through nodes C and D may be optimal because of better links. However, the link between nodes B and E can be so bad that it does not allow larger data packets to go through and hence may not even be a useful route. If this is the case and node B is not able to send data packets successfully, it will generate a route error for node E to A. Node A will therefore restart the Route Discovery process and may get the same route because of the reasons explained above. Hence, the optimal route is never found and network bandwidth is wasted by repeated route discoveries.

Another problem with the On-Demand routing protocols is their instantaneous nature of finding routes. On-Demand routing protocols find routes as needed and do not attempt to find any alternate route unless the current route is broken. The route found initially may be the optimal route (based on the metrics used) at that particular instant of time, but as time progresses, it may not be the best route due to node mobility, congestion and so on. Hence, this behavior can lead to inefficient routes and under utilization of network resources.

Accordingly, a need exists for a system and method that is capable of finding optimal routes in a wireless communication network without the drawbacks associated with the existing techniques as described above.

SUMMARY OF THE INVENTION

An embodiment of the present invention eliminates the above drawbacks by providing a method for determining a route between nodes in a wireless communication network, such as a wireless ad-hoc peer-to-peer network, and a node capable of performing operations to determine a route between itself and another node. The operations include maintaining a respective link reliability value for each of a plurality of respective links between one of the nodes in the network and other nodes in the network, comparing the respective link reliability values to a threshold value, and controlling the node to issue a route warning message identifying any of the links whose respective link reliability value fails to meet the threshold value before the link has failed. The respective link reliability values can be updated for each of the respective links based on conditions affecting the quality of the respective links.

The node can be further controlled to perform a route discovery process to discover another link to replace the link whose respective link reliability value fails to meet the threshold value, and this process can be repeated at periodic intervals that are determined based on a number of nodes neighboring the node, mobility of the node and a metrics-per-hop value representing a ratio of cumulative route metrics for links in a route between the node and a destination node to which a packet that the node is attempting to send is addressed and/or a number of hops between the node and the destination node.

Another embodiment of the present invention eliminates the above drawbacks by providing method for determining a route between nodes in a wireless communication network, such as a wireless ad-hoc peer-to-peer network, and a node capable of performing operations to determine a route between itself and another node. The operations include maintaining a metric-per-hop value representing a ratio of cumulative route metrics for a route between a source node attempting to send a packet and a destination node to which that packet is addressed and a number of hops between the source and destination nodes, comparing the metric-per-hop value to at least one threshold value, and controlling the source node to perform a route discovery process to discover another link to replace a link in the route whose metric-per-hop value fails to meet the threshold value. The metric-per-hop value can be updated based on conditions affecting the quality of the links in the route. The source node can perform the route discovery process using a time-to-live value equal to the number of hops in the route plus a factor that can be a function of a number of hops in the route, routing metrics of the route, and/or a constant.

The embodiments of the present invention thus decrease the route convergence time, provide an effective and efficient way to find optimal routes, and improve overall performance of the network with regard to throughput, delay, packet completion rate and so on.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 2:
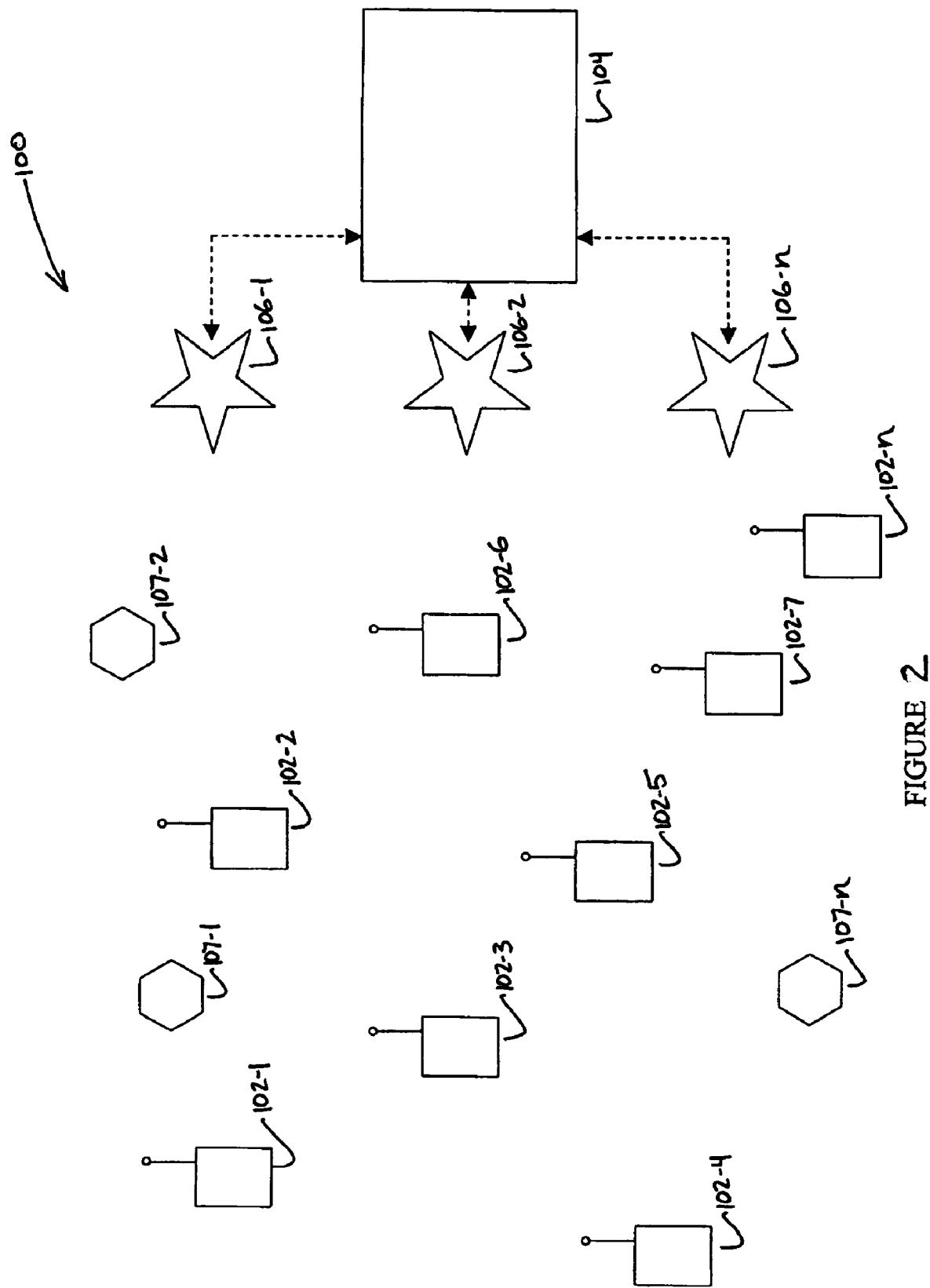
FIG. 2 is a block diagram of an example ad-hoc wireless communications network including a plurality of nodes employing a system and method in accordance with an embodiment of the present invention.

FIG. 2 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. Nos. 7,072,650, 6,807,165 and 6,873,839, referenced above.

Figure 3:
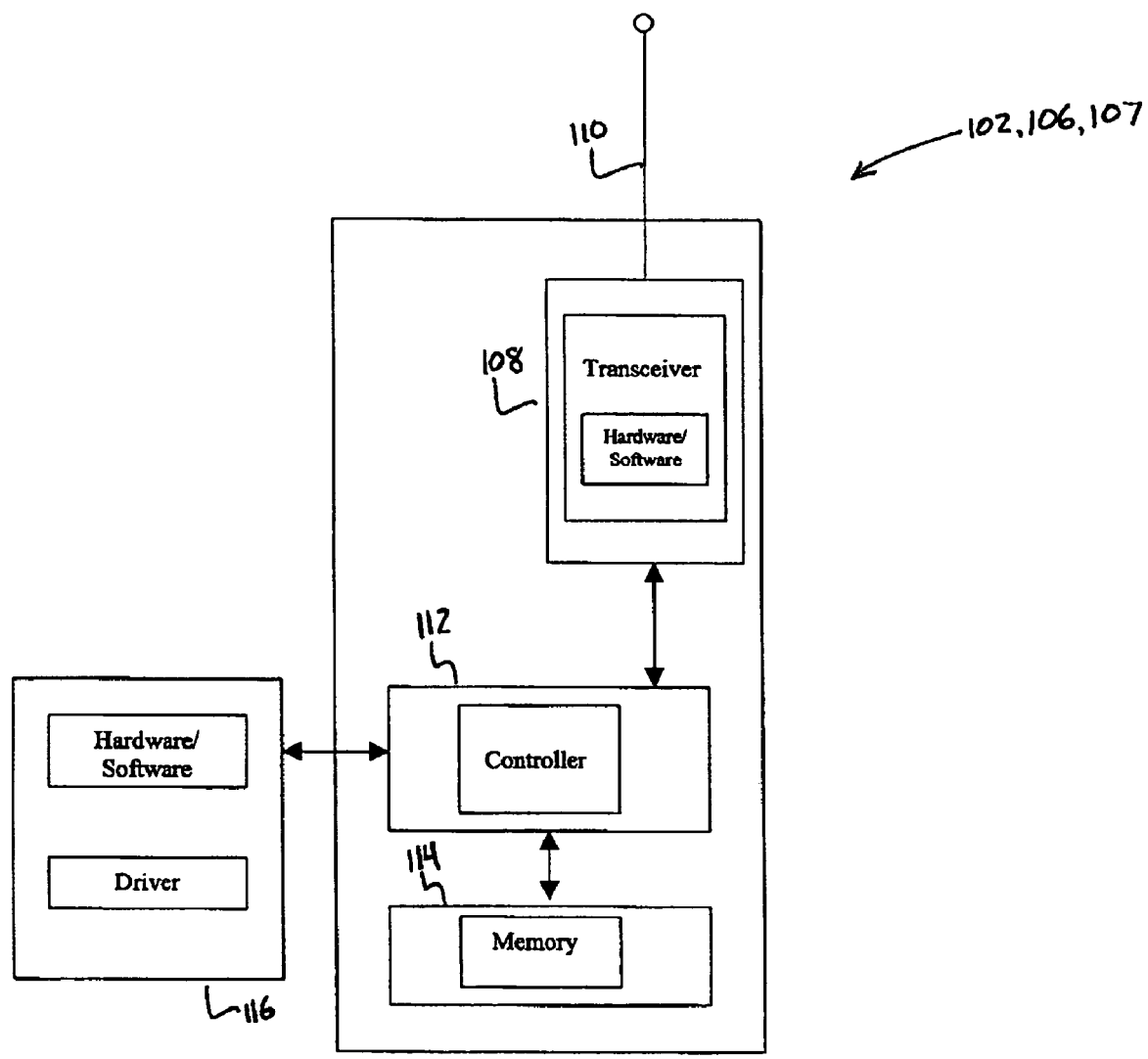
FIG. 3 is a block diagram illustrating an example of a mobile node employed in the network shown in FIG. 2.

As shown in FIG. 3, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 3, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP), Address Resolution Protocol (ARP) and Adaptive Transmission Protocol (ATP), the purposes of which can be readily appreciated by one skilled in the art. The appropriate hardware and software to perform transmission control protocol (TCP) and user datagram protocol (UDP) may also be included.

Routing techniques according to embodiments of the present invention will now be described. These techniques eliminate the problems associated with existing techniques, such as On-Demand protocols as discussed in the Background section above.

One technique according to an embodiment of the present invention employs the link reliability value being provided by the ATP module. The link reliability can represent signal strength, packet completion rate, data rate, battery power, congestion, etc. The link reliability can be determined in various ways as described in U.S. Patent Application Publication No. 20040246935 of Avinash Joshi and Guenael T. Strutt entitled "System and Method for Characterizing the Quality of a Link in a Wireless Network", filed on Jun. 7, 2004, and published on Dec. 9, 2004; U.S. Patent Application Publication No. 20020191573 of Eric A. Whitehill et al. entitled "Embedded Routing Algorithms Under the Internet Protocol Routing Layer of a Software Architecture Protocol Stack", filed on May. 31, 2002, and published on Dec. 19, 2002; and in a U.S. Patent Application Publication No. 20030189906 of John Belcea entitled "System and Method for Providing Adaptive Control of Transmit Power and Data Rate in an Ad-Hoc Communication Network", filed on Mar. 15, 2002, and published on Oct. 9, 2003; the entire content of each of these patent applications being incorporated herein by reference.

This link reliability value is constantly updated by the ATP module on a reception of, or lack of, a packet from a neighbor node 102, 106 or 107. These values can be indexed from 0 to 255 (8 bit value) and can have following meaning as indicated in Table 1.

TABLE 1

ATP Index Value Pertaining to Link Reliability and Quality

| ATP Index | Link Reliability | Quality |
|---|---|---|
| 0-50 | 0-20% | Extremely BAD |
| 50-100 | 20-40% | BAD |
| 100-150 | 40-60% | POOR |
| 150-200 | 60-80% | ACCEPTABLE |
| 200-255 | 80-100% | GOOD |

According to the Table 1, when the ATP Index value for a certain neighbor node 102, 106 or 107 falls below 50, the link becomes Extremely Bad and significant packet losses are expected if the link is still used to send data packets. As discussed above, existing On-Demand routing protocols do not even react until a link breakage occurs. To avoid this kind of packet loss, this technique according to an embodiment of the present invention specifies a node to issue a Route Warning Message as soon as the ATP index for the link between itself and the other node which is being used as a next hop in some route falls below some threshold. A Route Warning message is sent and forwarded similar to Route Error message in standard On-Demand protocols and has the destination (or list of destinations) which will be lost due to the anticipated breakage of the link. But processing of this message is done differently. In place of simply erasing the route in question, a node receiving a Route Warning message keeps the current route but initiates a new route discovery process if it is sourcing some data to the concerned destination. This route discovery process should compute an alternate route to the destination before the breakage of the current route and hence offers "make before break" mechanism or, in other words, it adds proactiveness in a reactive routing protocol.

An embodiment of the invention can be described using the example network shown in FIG. 2. Assuming that in the example, network node 102-1 is using node 107-1 as the next hop to reach destination node 106-1. Specifically, it is using the route 102-1-107-1-102-2-107-2-106-1, that is, it is using a 4 hop route to reach the destination node 106-1. Now if the ATP Index at node 102-2 for node 107-2 falls below the threshold (150), node 102-2 will transmit a Route Warning message to the precursor list of the concerned node. In this case, the Route Warning message will be sent to node 107-1. Since node 107-1 is not sourcing any packet to destination 106-1, it will simply forward the Route Warning message to node 102-1. Since node 102-1 is sourcing traffic to node 106-1, it will reinitiate a route discovery process to find an alternate route to destination 106-1. This route discovery process should use the TTL as the current hop count to the destination plus X, where X can be a function of number of hops in the current route, routing metrics of the current route, number of neighbors, some constant, or a combination of all of these criteria. This route discovery process should result in a computation of an alternate route to the destination (e.g., through node 102-3 in this example) before breaking the current route and hence offers a "make before break" mechanism or, in other words, adds proactiveness in a reactive routing protocol.

It should be noted that Route Warning messages have been used to warn about congestion in the network as described in a publication by Avinash Joshi entitled "Load Balancing, Queueing and Scheduling Mechanisms in Mobile ad hoc Networks", *MS Thesis*, University of Cincinnati, Engineering: Computer Science and Engineering, 2001, and to warn about lower battery power of a node as described in a publication by Nishant Gupta entitled "Resource Management in ad hoc Networks" *MS Thesis*, University of Cincinnati, Engineering: Computer Science and Engineering, 2001, both of these documents being incorporated herein by reference. However, these documents do not describe that a Route Warning message can be used to provide an alert that a link is becoming faulty.

A technique according to another embodiment of the present invention solves the problem of creating an un-optimal route caused because of expanding ring search as described in the Background section above. This embodiment also provides another way to offer "make before break" mechanism. Specifically, to avoid the problem caused due to expanding ring search, the controller 112 of the source node (e.g., node 102-1) computes a value referred to as a "Metric-per-Hop" to determine the quality of the overall route and takes action as described below. The "Metric-per-Hop" is simply the ratio of cumulative route metric between the source node (e.g., node 102-1) and the destination node (e.g., 106-1) and the number of hops between them. The route metric is calculated as explained in U.S. Pat. No. 7,280,483 entitled "System and Method to Improve the Network Performance of a Wireless Communication Network by Finding an Optimal Route Between a Source and a Destination", granted on Oct. 9, 2007, the entire content of which being incorporated herein by reference. Since the metrics associated with any route can change with time, the metrics should be sent along with each data packet flowing between the source and the destination. This metrics can be stored in some header of the data packet and updated as it traverses through different hops similar to the way route metrics are updated in the routing packets in U.S. Pat. No. 7,280,483 referenced above.

The "Metric-per-Hop" value for the route 102-1-107-1-102-2-107-2-106-1 can be used by the source node 102-1 in FIG. 2 to perform specific operations. For example, if the Metric-per-Hop is greater than the LINK_QUALITY_THRESHOLD, the source node 102-1 can determine (with some probability of error) that some link is (or links are) bad between it and the destination, in this example, link between node 102-2 and 107-2. The source node 102-1 can then restart a route discovery process with TTL equal to the number of hops in the route currently in use plus X, where X can be a function of number of hops in the current route, routing metrics of the current route, number of neighbors, some constant, or a combination of all of these criteria. This route discovery process should result in a computation of an alternate route to the destination (e.g., through node 102-3 in this example). The "Metric-per-Hop" value can also be used for QoS maintenance. For example packets generated by some applications can be rejected or accepted based on the current "Metric-per-Hop".

Figure 1:
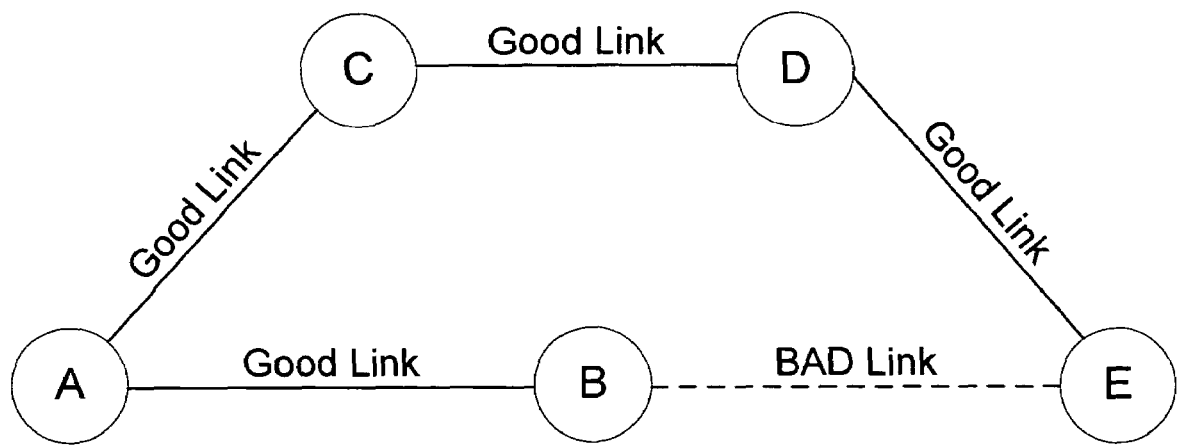
FIG. 1 is a conceptual diagram illustrating an example of a problem that can occur when performing the expanding ring search technique for finding routes between nodes in a wireless mobile communication networks.

Accordingly, referring to the example shown in FIG. 1, when node A computes the Metric-per-Hop for the route to destination E, it will realize that the Metric-per-Hop is higher than the LINK_QUALITY_THRESHOLD and hence some link is (or links are) bad in the route between itself and node E. As discussed in the Background section above, in this example, the link between node B and node E is bad. Therefore, node A will reissue the RREQ with TTL=2+X, where X can be a function of number of hops in the current route, routing metrics of the current route, number of neighbors, some constant, or a combination of all of the above. Assuming that X is a function of only the number of current hops and value equal to 0.5 times the current number of hops, the new TTL will be 3. This value will allow the RREQ to be forwarded by node D for the node E to receive. This will also allow the optimal route A-C-D-E to be created, thus efficiently avoiding the problems associated with the known protocols as discussed in the Background section above.

A technique according to another embodiment of the present invention ensures that the best route is maintained between the source node and the destination node at all times and avoids the related problem described in the Background section above. According to this technique, instead of performing the route discovery process just once, the source node (e.g., node 102-1) repeats the route discovery process at a periodic rate. The periodic rate can be determined by number of factors such as number of neighbor nodes, mobility of the node itself and/or its neighbor nodes, Metrics-per-Hop as described above, or in any other suitable manner. For example, the periodic rate should be high if the node 102-1 is itself mobile, and if the node is very mobile such as in a car moving at highway speed, it may be beneficial to avoid using this technique since the degree of mobility can result in the node performing the route discovery process at too frequent of a rate.

However, this technique yields excellent results in a stationary or relatively less mobile network. According to this technique, after completing the initial route discovery process, the source node (e.g., node 102-1 in this example) resends the Route Request Packet at a periodic rate. The RREQ packet is sent once in one period and no expanding ring search method is used. The RREQ packet is sent with a TTL equal to the number of hops in the route currently in use plus X, where X can be a function of number of hops in the current route, routing metrics of the current route, number of neighbors, some constant, or a combination of all of the above. A special bit "P" is also inserted in the RREQ packet to enable the other nodes 102, 106 and 107 to differentiate between this periodic RREQ and the regular RREQ. That is, a "P" bit is set (e.g., to "1") to signify that the RREQ is a periodic RREQ.

When other nodes 102, 106 or 107 receive the RREQ packet, their controller 112 checks the "P" bit of the RREQ. If the "P" bit is detected as being set, the controller 112 recognizes that the RREQ is a periodic RREQ and is being set by the source node 102-1 to see if a better route is available. When a node 102, 106 or 107 receives such an RREQ, the controller 112 of these respective nodes 102, 106 and 107 checks the respective routing table of its node to determine the route to the originating node which, in this case, is source node 102-1. If there is no route to the source node 102-1, then a new route is created as described by performing, for example, an AODV Routing Protocol as described above. Otherwise, the controller 112 compares the metrics in the packet against the metrics in the routing table of its node. If the metrics in the packet are better, that is, lower than the existing metrics in the routing table, then the routing table is updated and the packet is processed in accordance with the AODV technique, otherwise the packet is silently discarded. It should be noted here that the packet is silently discarded even if the sequence number of the originating node carried in the RREQ is higher than the one stored in the local routing table. As can be appreciated by one skilled in the art, the destination sequence number is created by the destination to be included along with any route information it sends to requesting nodes. Using destination sequence numbers ensures loop freedom and is simple to program. Given the choice between two routes to a destination, under the AODV technique, a requesting node is required to select the one with the greatest sequence number.

Accordingly, this approach of silently discarding the packet as discussed above is different from commonly used AODV technique where new RREQ packet is processed and routes are updated, even if the metrics are worse, if the sequence number carried in the RREQ is higher than the one locally stored. This approach avoids establishment of unstable routes when the originator node is just trying to find a better second route to a destination rather than trying to establish the first route to the destination. Hence, this periodic route discovery technique insures that the most optimal routes are maintained at all times.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for determining a route between nodes in a wireless communication network, the method comprising:
   maintaining a respective link reliability value for each of a plurality of respective links between one of the nodes in the network and other nodes in the network;
   comparing the respective link reliability values to a threshold value;
   controlling the node to issue a route warning message identifying any of the links whose respective link reliability value fails to meet the threshold value before the link has failed;
   controlling a node that receives the route warning message and that is sourcing data packets to a destination node whose link is identified by the route warning message to perform a route discovery process to discover another route to the destination node;
   repeating the route discovery process at periodic intervals, wherein when the node performs the route discovery process at each periodic interval, the node includes a periodic identifier in a route request packet that the node sends during the route discovery process to differentiate the route request packet being sent during a periodic performance of the route discovery process from a normal route request packet.

2. A method as claimed in claim 1, wherein:
   the network is a wireless ad-hoc peer-to-peer network; and
   each of the respective link reliability values represents a respective quality of a respective link between two of the nodes in the wireless ad-hoc peer-to-peer network.

3. A method as claimed in claim 1, wherein:
   the route discovery process uses a time to live (TTL) value as a current hop count in a current route between the node performing the route discovery process to the destination plus a factor that is a function of at least one of the following: a number of hops in the current route, routing metrics of the current route, number of neighbors and a constant value.

4. A method as claimed in claim 1, wherein:
   the maintaining step comprises updating the respective link reliability values for each of the respective links based on conditions affecting the quality of the respective links.

5. A method as claimed in claim 1, wherein the periodic intervals are determined based on at least one of the following: a number of nodes neighboring the node, mobility of the node and a metrics-per-hop value representing a ratio of cumulative route metrics for links in a route between the node and a destination node to which a packet that the node is attempting to send is addressed and a number of hops between the node and the destination node.

6. A method as claimed in claim 1, further comprising:
   when a node receives the route request packet sent during a periodic performance of the route discovery process, the node accepts the route request packet if metrics in the route request packet are better than current metrics it has stored, and discards the route request packet if the metrics in the route request packet are worse than the current stored metrics even if the route request packet carries a higher sequence number than that of a current route.

7. A node operating within a wireless communication network, the node comprising:
a controller, operating to maintain a respective link reliability value for each of a plurality of respective links between the node and other nodes in the network, to compare the respective link reliability values to a threshold value, and to control the node to issue a route warning message identifying any of the links whose respective link reliability value fails to meet the threshold value before the link has failed;
wherein the controller controls the node to perform a route discovery process to discover another link to replace the link whose respective link reliability value fails to meet the threshold value,
wherein the controller repeats the route discovery process at periodic intervals,
wherein when the node performs the route discovery process at each periodic interval, the node includes a periodic identifier in a route request packet that the node sends during the route discovery process to differentiate the route request packet being sent during a periodic performance of the route discovery process from a normal route request packet.

8. A node as claimed in claim 7, wherein:
the network is a wireless ad-hoc peer-to-peer network; and
each of the respective link reliability values represents a respective quality of a respective link between the node and the other nodes in the wireless ad-hoc peer-to-peer network.

9. A node as claimed in claim 7, wherein:
the controller updates the respective link reliability values for each of the respective links based on conditions affecting the quality of the respective links.

10. A node, as claimed in claim 7 wherein the periodic intervals are determined based on at least one of the following: a number of nodes neighboring the node, mobility of the node and a metrics-per-hop value representing a ratio of cumulative route metrics for links in a route between the node and a destination node to which a packet that the node is attempting to send is addressed and a number of hops between the node and the destination node.

11. A node as claimed in claim 7, wherein:
when a node receives the route request packet sent during a periodic performance of the route discovery process, the node accepts the route request packet if metrics in the route request packet are better than current metrics it has stored, and discards the route request packet if the metrics in the route request packet are worse than the current stored metrics even if the route request packet carries a higher sequence number than that of a current route.

12. A method for determining a route between nodes in a wireless communication network, the method comprising:
maintaining a respective link reliability value for each of a plurality of respective links between one of the nodes in the network and other nodes in the network;
comparing the respective link reliability values to a threshold value; and
controlling the node to issue a route warning message identifying any of the links whose respective link reliability value fails to meet the threshold value before the link has failed,
wherein the link reliability value comprises a metric-per-hop value representing a ratio of cumulative route metrics for a route between a source node attempting to send a packet and a destination node to which that packet is addressed and a number of hops between the source and destination nodes;
the method further comprising:
comparing the metric-per-hop value to at least one threshold value; and
controlling the source node to perform a route discovery process to discover another link to replace a link in the route whose metric-per-hop value fails to meet the at least one threshold value.

13. A method as claimed in claim 12, wherein:
the maintaining step comprises updating the metric-per-hop value based on conditions affecting the quality of the links in the route.

14. A method as claimed in claim 12, wherein:
the controlling the source node step controls the source node to perform the route discovery process using a time-to-live value equal to the number of hops in the route plus a factor.

15. A method as claimed in claim 14, wherein:
the factor is a function of at least one of a number of hops in the route, routing metrics of the route, and a constant.

16. A method as claimed in claim 12, further comprising:
controlling the source node to send the route metrics along with each data packet flowing between the source node and the destination node.

17. A method as claimed in claim 12, further comprising:
storing the route metrics in a header of a data packet being sent from the source node to the destination node; and
updating the route metrics as the data packet traverses through different nodes while traveling between the source node and the destination node.

18. A node operating within a wireless communication network, the node comprising:
a controller, operating to maintain a respective link reliability value for each of a plurality of respective links between the node and other nodes in the network, to compare the respective link reliability values to a threshold value, and to control the node to issue a route warning message identifying any of the links whose respective link reliability value fails to meet the threshold value before the link has failed,
wherein the link reliability value comprises a metric-per-hop value representing a ratio of cumulative route metrics for a route between the node and a destination node to which a packet being sent from the node is addressed and a number of hops between the node and the destination node,
wherein the controller compares the metric-per-hop value to at least one threshold value and controls the node to perform a route discovery process to discover another link to replace a link in the route whose metric-per-hop value fails to meet the at least one threshold value.

19. A node as claimed in claim 18, wherein:
the controller updates the metric-per-hop value based on conditions affecting the quality of the links in the route.

20. A node as claimed in claim 18, wherein:
the controller controls the node to perform the route discovery process using a time-to-live value equal to the number of hops in the route plus a factor.

21. A node as claimed in claim 20, wherein:
the factor is a function of at least one of a number of hops in the route, routing metrics of the route, and a constant.

22. A node as claimed in claim 18, wherein:
the controller controls the node to send the route metrics alone with each data packet flowing between the node and the destination node.

23. A node as claimed in claim 18, wherein:
the controller store the route metrics in a header of a data packet being sent from the node to the destination node, such that the route metrics can be updated as the data packet traverses through different nodes while traveling between the node and the destination node.

* * * * *